United States Patent Office 2,708,149
Patented May 10, 1955

2,708,149

COLORATION OF TEXTILE FIBERS WITH NITROKETOARYLAMINES

Nicholas J. Kartinos, Nazareth, Pa., and James B. Normington, Belvidere, N. J., assignors to General Aniline & Film Corporation, New York, N. Y., a corporation of Delaware No Drawing. Application November 13, 1950,
Serial No. 195,454

7 Claims. (Cl. 8—55)

This invention relates to the coloration of textile fiber of organic derivatives of cellulose and of synthetic superpolyamides.

More particularly, the invention relates to the dyeing or printing of textile fiber of cellulose esters and ethers, such as cellulose acetate and ethyl cellulose, as well as synthetic superpolyamide fiber (nylon) such as polyhexamethylene adipamide, with compounds having the following formula:

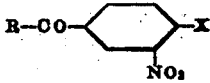

wherein R is an alkyl group of 1 to 5 carbon atoms, and X is a cyclic (carbocyclic or heterocyclic) radical, preferably an anilino radical, having a basic nitrogen atom joined by the single valence bond to the benzene ring, said compounds containing no water-solubilizing salt-forming substituents such as sulfo or carboxyl groups.

In addition, the invention relates to a novel class of compounds of the aforesaid series.

In an investigation of the reactivity of bromine in 3-nitro-4-bromoacetophenone, Borsche et al., in Berichte 49 (1916), page 2236, disclose preparation of 3-nitro-4-anilino-acetophenone by condensation of 3-nitro-4-bromo-acetophenone with aniline. However, this compound is described as consisting of orange-red crystals with no indication that it could be employed for dyeing textiles.

We have discovered that the aforesaid compounds, which are water-insoluble, can be readily dispersed in aqueous media to form coloring compositions which, on application to cellulose ester or ether fibers or to nylon, yield strong shades of bright green-yellow to red-yellow to brown, having outsanding fastness properties, especially fastness to light. When applied from aqueous dispersions to the aforesaid fibers, these compounds exhibit good to excellent affinity for the fiber and possess high tinctorial strength.

It is an object of this invention to provide a process for coloring the aforesaid textile fibers with compounds of the formula given above, and to provide novel compounds of the class defined by said formula.

The dyestuff compounds of this invention can be readily prepared by heating a 3-nitro-4-chloro- or -bromo-alkyl-keto-benzene with a primary or secondary amino compound of the carbocyclic or heterocyclic series, preferably with aniline and its nuclear substitution products, in the presence of a hydrogen halide acceptor such as aqueous or anhydrous sodium bicarbonate, or other alkaline-reacting salts. The product can be recovered by washing and filtration, and purified by recrystallizing from a lower alcohol.

In addition to aniline, other primary and secondary amines and —NH— heterocyclic bases can be used for the preparation of dyestuffs of the invention by condensation with 3-nitro-4-halo-phenyl alkyl ketones. These compounds include aniline homologs, aryl and aralkyl anilines, N-alkyl anilines, N-(hydroxyalkyl) anilines, alkoxy and hydroxyalkoxy anilines, dialkylamino anilines, N,N-bis-(hydroxyalkyl) phenylene diamines, N-acyl phenylene diamines, carbalkoxy anilines, heterocyclic substituted anilines, naphthylamines, alicyclic amines, heterocyclic amines, and —NH— heterocyclic bases.

Preparation of the dyestuff compounds and their application for dyeing textiles of the type specified above is illustrated in the following examples, wherein parts and percentages are by weight.

Example 1

6 parts (0.03 mol) of 3-nitro-4-chloroacetophenone and 2.79 parts (0.03 mol) of aniline were mixed with a solution of 2.5 parts of sodium bicarbonate in 50 parts of water, and the mixture heated to boiling under reflux for 16 hours. A viscous oil separated on cooling, and after decanting the water, the residue was crystallized from isopropyl alcohol. 6.45 parts of an orange crystalline solid were obtained amounting to a yield of 84% of theory, said compound being the same as that obtained by Borsche et al. according to Berichte 49 (1916), page 2236. The formula of this compound is as follows:

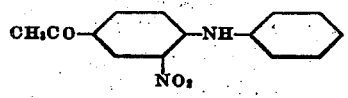

By omitting the water in the foregoing reaction mixture, and heating at 100 to 150° C. for 5 to 30 minutes, and recrystallizing the resulting condensation product from isopropyl alcohol, the same product is obtained in similar or better yields.

1 to 3 parts of the aforesaid compound were dissolved in a small amount of a mixture of equal volumes of alcohol and acetone, and the solution diluted with 40 parts of a 5% solution of N,N-oleyl methyl taurine sodium salt. The solution was diluted with water at 45 to 55° C. to a total of 5000 parts, and 100 parts of cellulose acetate silk were worked in the resulting dyestuff dispersion to effect a dyeing. The temperature was raised to 70 to 90° C. When dyeing was complete, the dyed sample was washed with a dilute aqueous soap solution, rinsed with water and dried. A green-yellow shade of excellent light fastness was obtained, the dyestuff showing excellent affinity for the fiber and high tinctorial strength. Similar shades are produced on nylon fiber by the same treatment.

Upon substituting N-methyl aniline for aniline in this example, the N-methyl derivative of the compound above formulated is obtained in the form of crystals melting at 86 to 90° C. When applied for dyeing cellulose acetate silk or nylon as described above, it yields reddish-yellow shades of similar fastness and affinity.

Example 2

3-nitro-4-chloroacetophenone was condensed by the procedure of Example 1 with an equimolecular amount of each of the following amines:

1. p-Anisidine
2. p-Phenetidine
3. p-(2-hydroxyethoxy)-aniline
4. N,N-diethyl-p-phenylene diam...
5. N-acetyl-p-phenylene diamine The compounds obtained by such condensation were recovered in yields ranging from 50 to 95.5% of theory and had the following formulas and melting points, respectively:

| | Melting Point, °C |
|---|---|
| 1. CH₃CO—⟨⟩(NO₂)—NH—⟨⟩—OCH₃ | 131 to 133 |
| 2. CH₃CO—⟨⟩(NO₂)—NH—⟨⟩—OC₂H₅ | 103 to 104 |
| 3. CH₃CO—⟨⟩(NO₂)—NH—⟨⟩—OC₂H₄OH | 120 to 121 |
| 4. CH₃CO—⟨⟩(NO₂)—NH—⟨⟩—N(C₂H₅)₂ | 100 |
| 5. CH₃CO—⟨⟩(NO₂)—NH—⟨⟩—NH-CO-CH₃ | 192 to 195 |

When the foregoing compounds were applied to cellulose acetate silk in the same manner as in Example 1, dyeings were produced which exhibited the following properties:

1. Red-yellow—excellent light fastness, fair wash fastness and affinity for the fiber.
2. Red-yellow—excellent light fastness, fair wash fastness and affinity for the fiber.
3. Green-yellow—excellent light fastness, good wash fastness.
4. Light brown—excellent light fastness.
5. Red-yellow—excellent light fastness.

The compounds of Example 2 have not been previously disclosed. They correspond to the general formula:

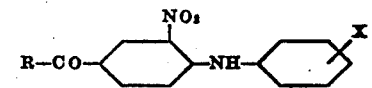

where R is an alkyl group of 1 to 5 carbon atoms and X is a member of the group consisting of aliphatic ether and aliphatic-substituted amino radicals containing 1 to 4 carbon atoms, said compound containing no water-solubilizing salt-forming group.

The following additional compounds, prepared as described in Example 1 by condensation of 3-nitro-4-chloroacetophenone respectively with p-aminophenyl trimethyl silane, cyclohexylamine, 2-methyl cyclohexylamine, morpholine, 3,4,5-trimethoxy aniline, and 2,6-dimethoxy aniline, have the following formulas and melting points and yield the following colorations on cellulose acetate materials:

| | Melting Point (if solid) | Coloration on Cellulose Acetate |
|---|---|---|
| CH₃CO—⟨⟩(NO₂)—NH—⟨⟩—Si(CH₃)₃ | Oil | Golden Yellow |
| CH₃CO—⟨⟩(NO₂)—NH—cyclohexyl | 125° C | Greenish-Yellow |
| CH₃CO—⟨⟩(NO₂)—NH—(2-methyl cyclohexyl) | Oil | Yellow |
| CH₃CO—⟨⟩(NO₂)—N(morpholino) | 63 to 64° C | Greenish-Yellow |
| CH₃CO—⟨⟩(NO₂)—NH—⟨⟩(OCH₃)(OCH₃)(OCH₃) | 178 to 180° C | Yellow |
| CH₃CO—⟨⟩(NO₂)—NH—⟨⟩(CH₃O)(CH₃O) | 193 to 194° C | Do. |

In a similar manner, the condensation product of primary cyclic amines with other 3-nitro-4-halo-phenyl alkyl ketones can be used in which the alkyl group contains 1 to 5 carbon atoms, as, for example, 3-nitro-4-bromoacetophenone, 3-nitro-4-chloropropiophenone, 3-nitro-4-chlorovalerophenone, and 3-nitro-4-chlorocaprophenone.

Other dyestuffs which can be employed in a similar manner and with similar advantages in accordance with this invention for dyeing cellulose ester and ether textile fibers and nylon are the condensation products of 3- nitro-4-chloroacetophenone, or the other nitrohalophenyl alkyl ketones mentioned above with cyclic primary amines, such as p-toluidine, m-xylidine, N,N-bis-(2-hydroxyethyl)-p-phenylene diamine, methyl p-aminobenzoate, N-(2'-hydroxyethyl)-aniline, amino-biphenyl, amino-diphenyl methanes, 1-(p-aminophenyl)-3-methyl-pyrazolone-5, p-(N'-morpholino)-aniline, α- and β-naphthylamines, aminomethyl pyrazole, aminopyrrole, 3-aminopyrazolone-5, 2-, 3- and 4-aminoquinoline, 2-aminothiazole, α-aminothiophene, piperidine, and the like.

In applying these compounds for coloring organic derivatives of cellulose, especially its esters and ethers such as cellulose acetate and ethyl cellulose or superpolyamide fibers such as polyhexamethylene adipamide, other water-soluble dispersing agents can be used instead of N,N-oleyl methyl taurine. For example, such dispersing agents include sulfonated naphthalene formaldehyde condensation products, sulfosuccinic acid esters, turkey red oil, alkylphenol ethylene oxide condensation products, soap, and similar surface-active materials with or without protective colloids such as dextrin, British gum and water-soluble proteins, to maintain the dyestuff in dispersion. The dyestuffs can be first solubilized by treatment with oily or fatty, or carbocyclic solubilizing agents as disclosed in U. S. P. 1,618,413 and U. S. P. 1,618,414, or converted to dispersible powder form by kneading with protective colloids and surface-active agents, drying and grinding as disclosed in the Crossley et al. patents, Reissue 21,420 and U. S. P. 2,181,800.

Variations and modifications which will be obvious to those skilled in the art can be made in the foregoing procedures without departing from the scope or spirit of the invention.

We claim:

1. Water-insoluble textile fibers of the class consisting of cellulose esters and ethers and nylons, colored with a compound having the formula:

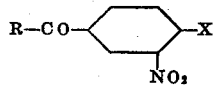

wherein R is an alkyl group of 1 to 5 carbon atoms and X is a cyclic radical, of the group consisting of monocyclic and bicyclic aromatic and heterocyclic radicals, containing up to 4 acyclic carbon atoms in nuclear substituent groups, and having a basic nitrogen atom joined by the single valence bond to the benzene ring, said compound containing no water-solubilizing salt-forming substituents, the said colored textile fibers exhibiting excellent light fastness and high tinctorial strength.

2. Water-insoluble textile fibers of the class consisting of cellulose esters and ethers and nylons, colored with a compound having the formula:

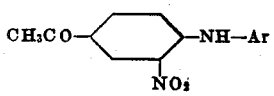

wherein Ar is a phenyl radical containing up to 4 acyclic carbon atoms in nuclear substituent groups, and containing no water-solubilizing salt-forming substituents, the said colored textile fibers exhibiting excellent light fastness and high tinctorial strength.

3. Water-insoluble textile fibers of the class consisting of cellulose esters and ethers and nylons, colored with a compound having the formula:

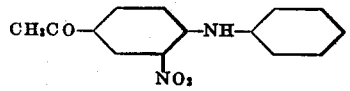

the said colored textile fibers exhibiting excellent light fastness and high tinctorial strength.

4. Water-insoluble textile fibers of the class consisting of cellulose esters and ethers and nylons colored with a compound having the formula:

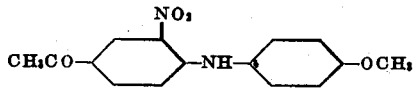

the said colored textile fibers exhibiting excellent light fastness and high tinctorial strength.

5. Water-insoluble textile fibers of the class consisting of cellulose esters and ethers and nylons, colored with a compound having the formula:

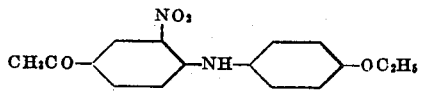

the said colored textile fibers exhibiting excellent light fastness and high tinctorial strength.

6. Water-insoluble textile fibers of the class consisting of cellulose esters and ethers and nylons, colored with a compound having the formula:

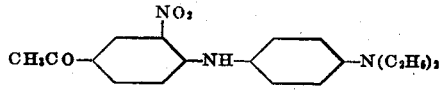

the said colored textile fibers exhibiting excellent light fastness and high tinctorial strength.

7. Water-insoluble textile fibers of the class consisting of cellulose esters and ethers and nylons, colored with a compound having the formula:

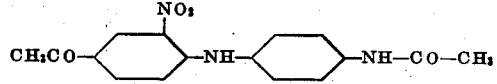

the said colored textile fibers exhibiting excellent light fastness and high tinctorial strength.

References Cited in the file of this patent

UNITED STATES PATENTS

| | | |
|---|---|---|
| 1,618,415 | Ellis | Feb. 22, 1927 |
| 1,947,038 | Ellis | Feb. 13, 1934 |
| 2,046,356 | Wyler et al. | July 7, 1936 |
| 2,059,800 | Laska et al. | Nov. 13, 1936 |
| 2,325,797 | Pizzarello | Aug. 3, 1943 |
| 2,406,578 | Bart | Aug. 27, 1946 |

FOREIGN PATENTS

| | | |
|---|---|---|
| 279,135 | Great Britain | Jan. 18, 1929 |

OTHER REFERENCES

Browning: "J. Chem. Soc." (London), 1943, pp. 344–347.

Plant et al.: "J. Chem. Soc." (London), 1935, pp. 741 to 744.

Borsche et al.: "Ber. deut. Chem. Gesell," vol. 49 (1916, p. 2236).